United States Patent
Minami

(10) Patent No.: US 9,988,029 B2
(45) Date of Patent: Jun. 5, 2018

(54) VEHICLE BRAKING FORCE CONTROL DEVICE

(71) Applicant: Nissan Motor Co., Ltd., Yokohama-shi, Kanagawa (JP)

(72) Inventor: Tatsuya Minami, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 461 days.

(21) Appl. No.: 14/374,558

(22) PCT Filed: Mar. 5, 2013

(86) PCT No.: PCT/JP2013/055895
§ 371 (c)(1),
(2) Date: Jul. 25, 2014

(87) PCT Pub. No.: WO2013/133232
PCT Pub. Date: Sep. 12, 2013

(65) Prior Publication Data
US 2015/0008726 A1  Jan. 8, 2015

(30) Foreign Application Priority Data
Mar. 5, 2012  (JP) .................................. 2012-048241

(51) Int. Cl.
*B60T 11/20* (2006.01)
*B60T 11/10* (2006.01)
(Continued)

(52) U.S. Cl.
CPC .............. *B60T 11/103* (2013.01); *B60L 7/18* (2013.01); *B60T 7/042* (2013.01); *B60T 8/885* (2013.01);
(Continued)

(58) Field of Classification Search
CPC ...... B60T 13/745; B60T 8/885; B60T 11/103; B60T 13/662; B60T 2270/414
(Continued)

(56) References Cited

U.S. PATENT DOCUMENTS 4,784,443 A * 11/1988 Weise ....................... B60T 8/96
303/146
5,962,997 A   10/1999 Maisch
(Continued)

FOREIGN PATENT DOCUMENTS

| JP | 2010-120522 A | 6/2010 |
| JP | 2010-188756 A | 9/2010 |
| WO | 2010/113574 A1 | 10/2010 |

OTHER PUBLICATIONS

The Extended European Search Report for the corresponding European patent application No. 13758334.0 dated Mar. 24, 2015.

*Primary Examiner* — Anna M Momper
*Assistant Examiner* — Mahbubur Rashid
(74) *Attorney, Agent, or Firm* — Global IP Counselors, LLP

(57) ABSTRACT

A vehicle braking force control device includes a braking force control unit. The braking force control unit is configured to shift to a drive state so as to use an auxiliary power source when a main power source fails, and to limit current outputted to an electric actuator of a braking device for producing braking hydraulic pressure when a transition is made to the drive state using the auxiliary power source. The braking force control unit has two current limit values used during actuation of the electric actuator by the auxiliary power source, the current limit values being a first current limit value for ensuring increased-braking-hydraulic-pressure characteristics, and a second current limit value for
(Continued)

ensuring a necessary minimum braking hydraulic pressure, the second current limit value being less than the first current limit value.

5 Claims, 9 Drawing Sheets

(51) Int. Cl.
  *B60L 7/18* (2006.01)
  *B60T 8/88* (2006.01)
  *B60T 7/04* (2006.01)
  *B60T 13/66* (2006.01)
  *B60T 13/74* (2006.01)

(52) U.S. Cl.
  CPC .......... *B60T 13/662* (2013.01); *B60T 13/745* (2013.01); *B60T 2270/414* (2013.01)

(58) Field of Classification Search
  USPC .......................................................... 303/14
  See application file for complete search history.

(56) References Cited

U.S. PATENT DOCUMENTS

| 2003/0233179 | A1 | 12/2003 | Matsubara et al. | |
|---|---|---|---|---|
| 2005/0067888 | A1 | 5/2005 | Nilsson | |
| 2007/0018499 | A1* | 1/2007 | Kokubo | B60K 6/445 303/151 |
| 2009/0326767 | A1* | 12/2009 | Kamada | B60T 1/005 701/48 |
| 2011/0316329 | A1* | 12/2011 | Nishino | B60T 7/042 303/14 |
| 2013/0082514 | A1* | 4/2013 | Murakami | B60T 13/745 303/14 |
| 2013/0325281 | A1* | 12/2013 | Terasaka | B60T 7/042 701/75 |

* cited by examiner

VEHICLE BRAKING FORCE CONTROL DEVICE

CROSS-REFERENCE TO RELATED APPLICATIONS

This application is a U.S. National stage application of International Application No. PCT/JP2013/055895, filed Mar. 5, 2013, which claims priority to Japanese Patent Application No. 2012-048241 submitted on Mar. 5, 2012, the contents of which are hereby incorporated herein by reference.

BACKGROUND

Field of the Invention

The present invention relates to a vehicle braking force control device for shifting a drive state to an auxiliary power source to ensure braking hydraulic pressure when a main power source fails.

Background Information

In the past there have been braking force control devices that use power supplied from a main power source and an auxiliary power source, comprising a control part for shifting the drive state from the main power source to the auxiliary power source when the output voltage of the main power source has decreased to or below a first threshold value, the control part incrementally reducing the power supplied to the braking device when the output voltage of the main power source decreases to or below a second threshold value which is greater than the first threshold value (see Japanese Laid-Open Patent Application No. 2010-188756, for example).

SUMMARY

However, in a conventional braking force control device, the output power is reduced according to the vehicle power source voltage before the shift to a state of operating with a backup power source (the auxiliary power source), but after the shift to the backup power source, the output power is reduced only by one limit value. Therefore, when the voltage is limited at a limit value that achieves the necessary minimum braking hydraulic pressure by a pressure increase after the shift to the backup power source, there will sometimes be needless power consumption due to insufficient limiting. Therefore, in various conceivable brake operation modes, the backup power source must be set to a capacity that ensures a necessary minimum braking force that allows for the needless power consumption. As a result, the backup power source has increased capacity, leading to the problem of increased cost.

The present invention focuses on the above problem, it being an object of the invention to provide a vehicle braking force control device that can ensure a necessary minimum braking force while reducing the auxiliary power source capacity by reducing needless power consumption after a transition has been made to a drive state using the auxiliary power source.

In order to achieve the above objective, the vehicle braking force control device of the present invention comprises a braking force control unit for shifting to a drive state so as to use an auxiliary power source when a main power source fails, and limiting the current outputted to an electric actuator of a braking device for producing braking hydraulic pressure when a transition is made to the drive state using the auxiliary power source.

In this vehicle braking force control device: the braking force control unit shifts among at least two current limit values, including a first current limit value for ensuring increased-braking-hydraulic-pressure characteristics during actuation of the electric actuator by the auxiliary power source, and a second current limit value for ensuring a necessary minimum braking hydraulic pressure, the second current limit value being less than the first current limit value.

As described above, when a shift is made to a drive state using the auxiliary power source during a main power source failure and a transition is made to the drive state using the auxiliary power source, at least two current limit values are shifted as the current limit value outputted for the electric actuator of the braking device for producing braking hydraulic pressure. These current limit values include a first current limit value for ensuring characteristic of increased hydraulic pressure, and a second current limit value for ensuring a necessary minimum braking hydraulic pressure, the second current limit value being less than the first current limit value.

For example, when the actuator is limited by the first current limit value immediately after the transition to the drive state using the auxiliary power source, pressure-increase responsiveness is ensured and the braking hydraulic pressure reaches the necessary minimum braking hydraulic pressure in a short amount of time. When the limit value is shifted and the actuator is limited by the second current limit value after the braking hydraulic pressure has reached the necessary minimum braking hydraulic pressure, the consumed power is kept to a minimum.

Thus, the first current limit value brings the hydraulic pressure to the necessary minimum braking hydraulic pressure by a pressure increase, and the second current limit value keeps the consumed power to a minimum. This allocation makes it possible to reduce the auxiliary power source capacity for ensuring the necessary minimum total braking force, because needless power consumption is reduced in cases such as when the actuator is limited by the first current limit value alone, for example. The braking device can be actuated for a longer amount of time by the auxiliary power source and the necessary minimum braking force can be ensured, by continuing the state of limiting the actuator by the second current limit value which keeps the consumed power to a minimum.

As a result, needless power consumption is reduced after a transition is made to a drive state using the auxiliary power source, whereby the necessary minimum braking force can be ensured while the auxiliary power source capacity is reduced.

BRIEF DESCRIPTION OF THE DRAWINGS

Referring now to the attached drawings which form a part of this original disclosure.

DETAILED DESCRIPTION OF EMBODIMENTS

Figure 1:
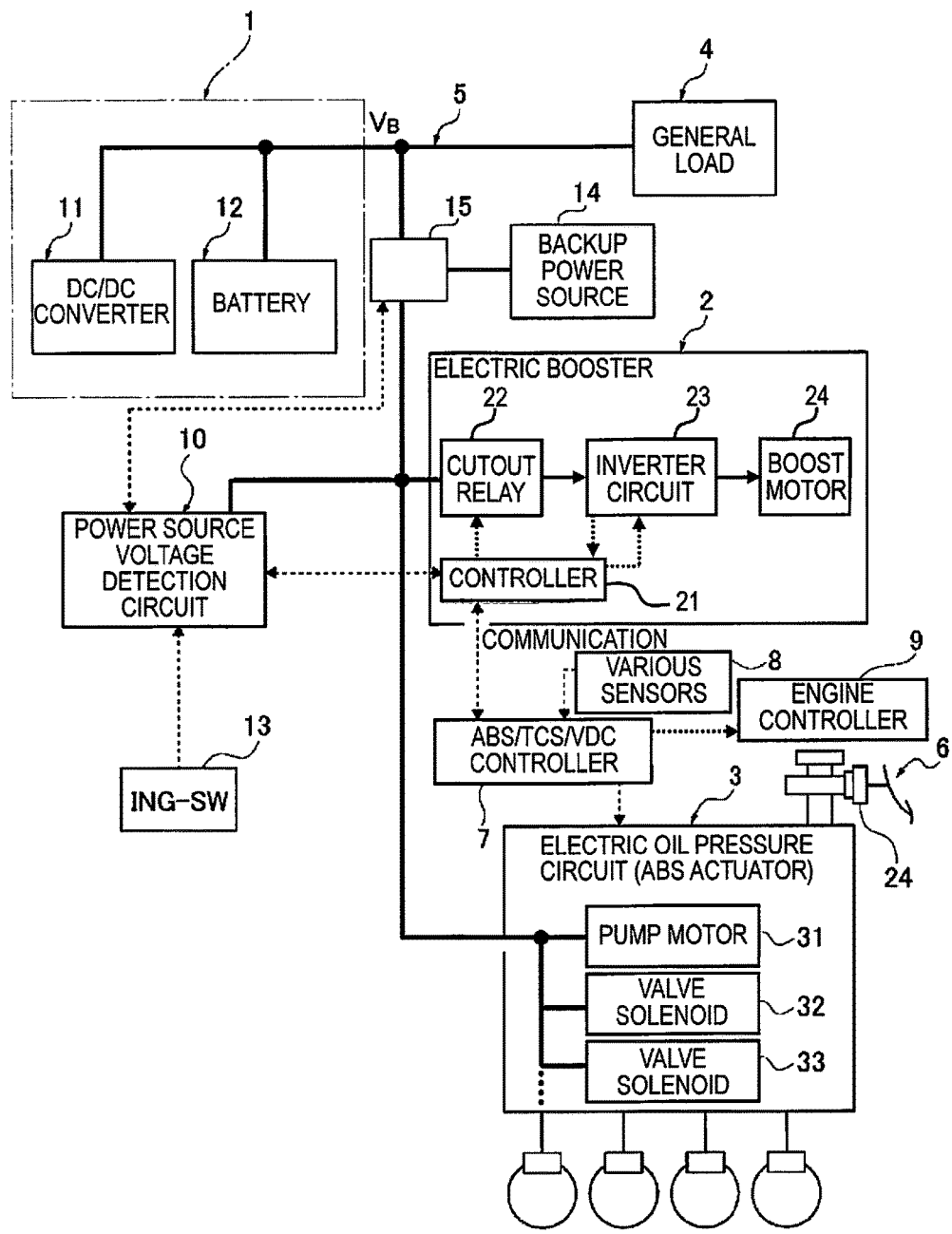
FIG. 1 is an overall system diagram showing the braking force control device of Embodiment 1 installed in an electric vehicle.

Preferred embodiments of the vehicle braking force control device of the present invention are described below based on Embodiment 1 and Embodiment 2 shown in the drawings.

Embodiment 1

First, the configuration will be described.

The configuration of the vehicle braking force control device of Embodiment 1 is described below under the headings: "overall system configuration," "configuration of electric booster," "configuration of electrically boosted brake device," and "current-limiting-enabled braking force control configuration."

Overall System Configuration

FIG. 1 is an overall system diagram showing the braking force control device of Embodiment 1 installed in an electric vehicle (an example of a vehicle). The overall system configuration is described below based on FIG. 1.

The braking force control device of Embodiment 1 comprises a vehicle power source 1 (main power source), an electric booster 2, an electric oil pressure circuit 3, a general load 4, a power source voltage detection circuit 10, and a backup power source 14 (auxiliary power source), as shown in FIG. 1.

In the case of an electric vehicle (an electric automobile, a hybrid vehicle, a fuel cell vehicle, or the like) equipped with the braking force control device of Embodiment 1, regenerative cooperation control is performed for achieving the braking force required by the driver through hydraulic pressure braking force and regenerative braking force. Therefore, compared to an engine vehicle in which the braking force required by the driver is achieved through hydraulic pressure braking force alone, there is a higher necessity of using an electric booster 2 that can perform boosting control with a high degree of freedom, and this brake system uses an electric booster 2.

The vehicle power source 1, which has a battery 12 and a DC/DC converter 11 for converting DC voltage from a battery pack for travel driving, generates a power source voltage VB (12 volts, for example). Downstream of the vehicle power source 1, the electric booster 2, the electric oil pressure circuit 3, and the general load 4 are connected in parallel via a power source line 5 as a plurality of load units associated with 12-volt system electric loads. The general load 4 is used herein as an all-inclusive term for a plurality of load units associated with 12-volt system electric loads other than the electric booster 2 and the electric oil pressure circuit 3; e.g., air conditioners, audio equipment, power windows, and the like.

The electric booster 2 is disposed in an electrically boosted brake device 6 comprising a brake pedal and a master cylinder, described hereinafter, and during a braking operation, the electric booster assists the pedal pressing force of the driver by means of motor torque instead of common negative-pressure boosting. This electric booster 2 has a controller 21, a cutout relay 22, an inverter circuit 23, and a boost motor 24.

The controller 21 measures the amount of pedal operation, which is input from the driver, and sends a command to the inverter circuit 23. The boost motor 24 is controlled according to this command, and the driver input is assisted by the necessary amount of boost. In addition to this boost control, a short circuit diagnosis is performed in which excessive current is channeled to the inverter circuit 23, and when the diagnosis is that there is a short circuit, current conduction to the inverter circuit 23 is cut off by a command to the cutout relay 22. Furthermore, boost limiting control is performed when a failure occurs in the vehicle power source 1 during a brake operation.

The electric oil pressure circuit 3, which is an ABS actuator used in ABS/TCS/VDC control, has an oil pump motor 31 capable of autonomously boosting braking hydraulic pressure, and a plurality of valve solenoids 32, 33, ... capable of adjusting the braking hydraulic pressure on the wheels of the vehicle.

ABS/TCS/VDC control, in which a vehicle dynamics control function (VDC function), a TCS function, and an ABS function are carried out by an ABS/TCS/VDC unit in order to improve travel safety, is control for supporting the driver.

The ABS/TCS/VDC unit has the electric oil pressure circuit 3, an ABS/TCS/VDC controller 7, various sensors 8, and an engine controller 9. The ABS/TCS/VDC controller 7 senses factors such as driving operations by the driver and vehicle speed by means of the various sensors 8, and automatically controls brake pressure (a command to the electric oil pressure circuit 3) and engine output (a command to the engine controller 9). This reduces skidding when encountering slippery road surfaces, cornering, or avoiding obstacles, and increases travel safety. Two-way communication by local communication, CAN communication, or the like is established between the ABS/TCS/VDC controller 7 and the controller 21.

The power source voltage detection circuit 10 detects the power source voltage VB of the vehicle power source 1 in a state in which the electric booster 2 has been activated. In other words, when an ignition switch 13 is on, the power source voltage VB of the vehicle power source 1 is measured. When the power source voltage VB falls to or below a failure determination threshold, it is determined that the vehicle power source 1 has failed, and a command to shift from the vehicle power source 1 to the backup power source 14 is outputted to a power source shifter 15. At the same time, failure information of the vehicle power source 1 is outputted to the controller 21.

The backup power source 14 is a power source that replaces the vehicle power source 1 and backs up the vehicle power source 1 to ensure a braking force control action on the brake system that uses the electric booster 2 when the vehicle power source 1 has failed, and the backup power source is a battery having the necessary capacity.

Configuration of Electric Booster

Figure 2:
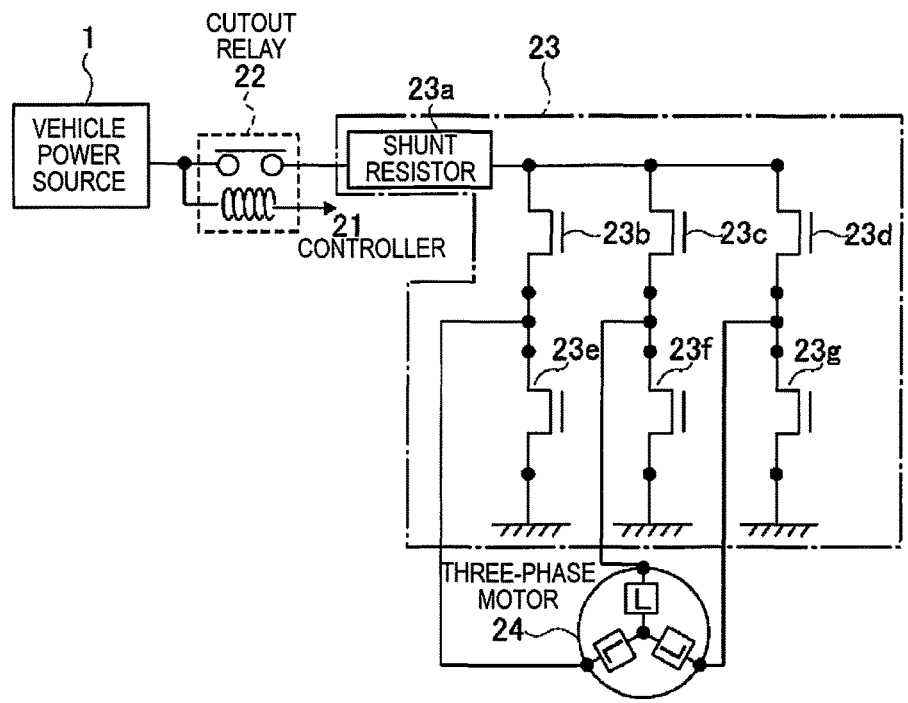
FIG. 2 is a diagram showing an electric booster having an inverter circuit using a basic configuration in the braking force control device of Embodiment 1.

FIG. 2 is a circuit diagram showing the electric booster 2 having the inverter circuit 23 using a basic configuration in the braking force control device of Embodiment 1. The configuration of the electric booster 2 is described below based on FIG. 2.

The electric booster 2 has the controller 21, the cutout relay 22, the inverter circuit 23, and the boost motor 24, as shown in FIG. 2.

The cutout relay 22 is a relay for cutting out the vehicle power source 1 when the system is not operating or when something abnormal has happened and the system has stopped. Usually, the cutout relay receives commands from the controller 21 in the electric booster 2.

The inverter circuit 23 has a shunt resistor 23a and six shifting switches 23b, 23c, 23d, 23e, 23f, 23g.

The shunt resistor 23a is a low-resistance-value, high-precision resistor for observing the current flowing from the power source line 5. The current actually flowing is taken into a monitor circuit of the controller 21 as a difference in electric potential.

The shifting switch 23b, which uses a power FET, sequentially shifts the upstream shifting switches 23b, 23c, 23d and the downstream shifting switches 23e, 23f, 23g, and controls the current flowing to each phase (coil).

The boost motor 24 is a rotatably driven three-phase motor which shifts among the phases by high-speed switching by PWM from the inverter circuit 23. The boost motor 24 is not limited to a three-phase motor, and if a DC brush motor or the like is used, rotatable driving control is possible even if the inverter circuit 23 is replaced with an H-bridge motor driver and a mechanical relay or the like is used.

Configuration of Electrically Boosted Brake Device

Figure 3:
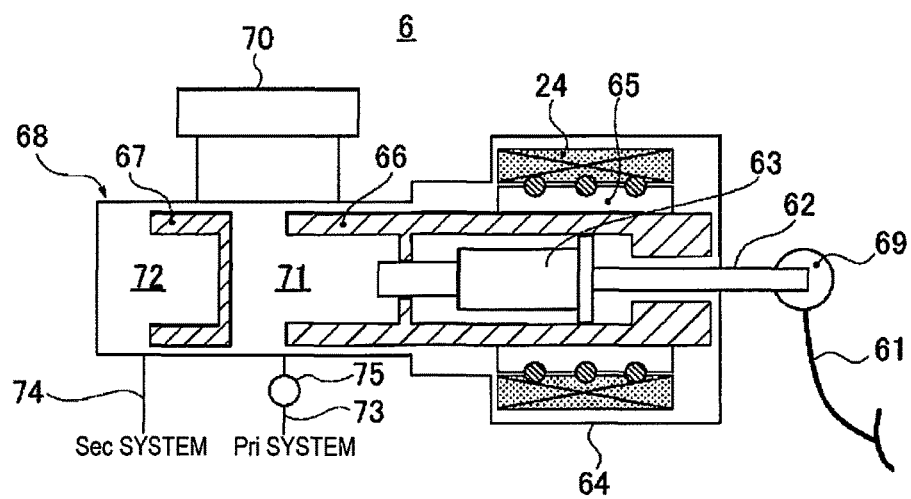
FIG. 3 is a schematic view showing an electrically boosted brake device used in the braking force control device of Embodiment 1.

FIG. 3 is a schematic view showing the electrically boosted brake device 6 used in the braking force control device of Embodiment 1. The configuration of the electrically boosted brake device 6 is described below based on FIG. 3.

The electrically boosted brake device 6 (the braking device) comprises a brake pedal 61, an input rod 62, an input piston 63, a booster housing 64, the boost motor 24 (the electric actuator), a ball screw mechanism 65, a primary piston 66, a secondary piston 67, and a master cylinder 68, as shown in FIG. 3.

The brake pedal 61 transmits a pedal pressing force to the input rod 62 and the input piston 63 when the driver applies pedal pressing force. This pedal pressing force transmission system is provided with a stroke sensor 69 for detecting the amount of pedal operation by the driver. A pair of coil springs are interposed between the flange part of the input piston 63 and the primary piston 66, and the coil springs keep the input piston 63 urged in a neutral position when the brake is not being operated.

The boost motor 24, which is housed in a booster housing 64 secured to a dash panel (not shown) or the like, is configured from a stator secured to the booster housing 64 and a rotor spaced from the stator across an air gap. Disposed on an inside position of this boost motor 24 is the ball screw mechanism 65 for converting the rotor rotational force of the boost motor 24 to axial assist thrust and transmitting the thrust to the primary piston 66.

The master cylinder 68 is a braking hydraulic pressure generating device for generating braking hydraulic pressure from primary hydraulic pressure and secondary hydraulic pressure, boosted by assist-controlling the boost motor 24, as shown in FIG. 3. Specifically, when the brake is not being operated, a reservoir tank 70 is communicated via ports with a primary hydraulic pressure chamber 71 formed by the primary piston 66 and a secondary hydraulic pressure chamber 72 formed by the secondary piston 67. When the brake is operated, the port communication is cut out by the leftward stroke of the primary piston 66 and the secondary piston 67 in FIG. 3, and the primary hydraulic pressure and secondary hydraulic pressure are increased according to the combined total of the pedal pressing force and the assist thrust. The primary hydraulic pressure is supplied to a primary hydraulic pressure tube 73, and the secondary hydraulic pressure is supplied to a secondary hydraulic pressure tube 74. A braking hydraulic pressure sensor 75 is provided to the primary hydraulic pressure tube 73.

Current-Limiting-Enabled Braking Force Control Configuration

Figure 4:
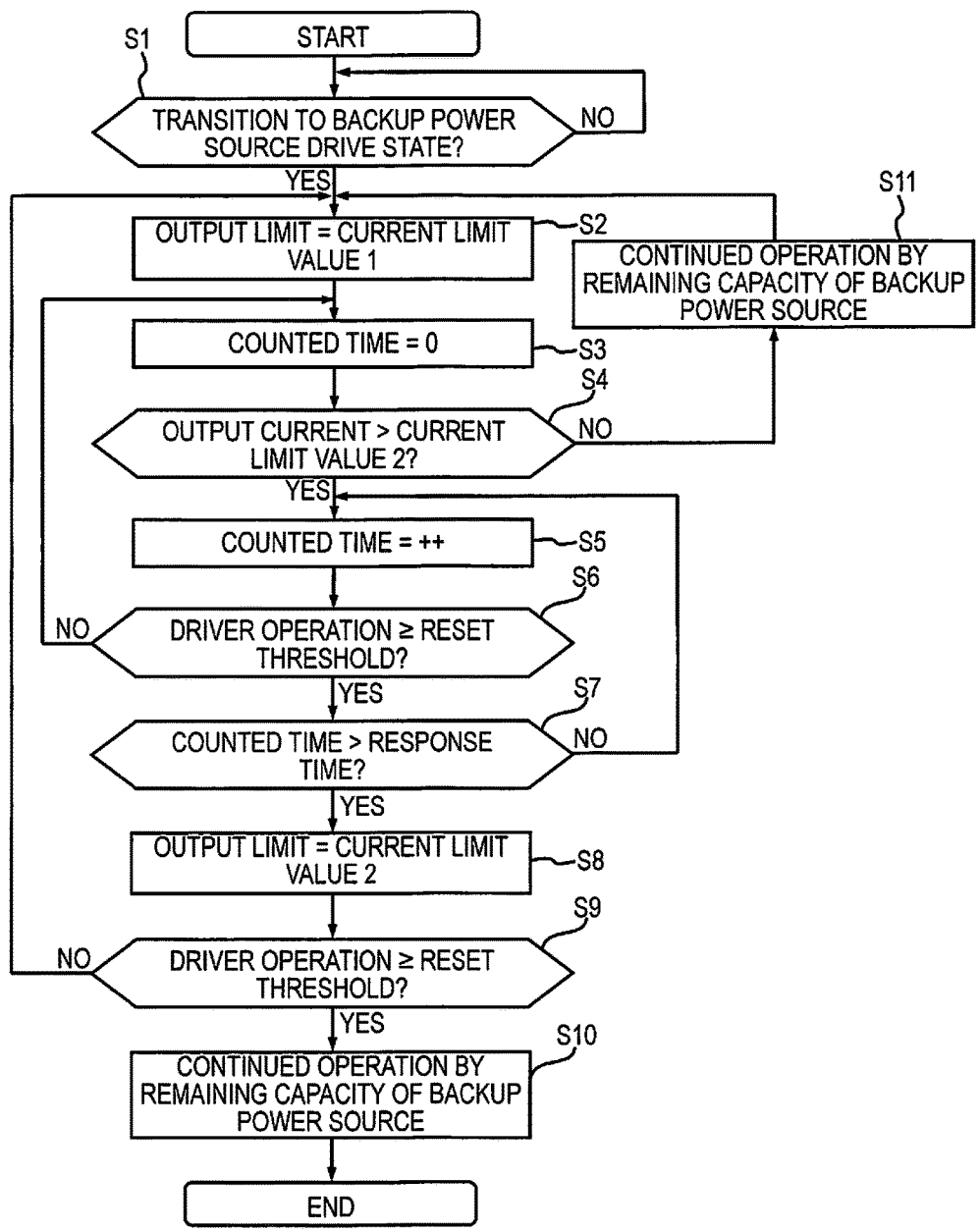
FIG. 4 is a flowchart showing the flow of a braking force control process using current limits, executed by a controller of an electric booster in the braking force control device of Embodiment 1.

FIG. 4 is a flowchart showing the flow of the current-limiting-enabled braking force control process, executed by the controller 21 of the electric booster 2 in the braking force control device of Embodiment 1. The steps of FIG. 4 showing the braking force control configuration are described below.

The current-limiting-enabled braking force control process is initiated by the controller 21 inputting failure information relating to the vehicle power source 1 from the power source voltage detection circuit 10.

Step S1 assesses whether or not the transition is complete to the drive state using the backup power source 14 by the shifting action of the power source shifter 15. When the assessment is YES (the transition to the backup power source drive state is complete), the process advances to step S2, and when the assessment is NO (the transition to the backup power source drive state is not complete), the assessment of step S1 is repeated.

In step S2, as a continuation of either the assessment in step S1 that the transition to the backup power source drive state is complete or an assessment in step S9 that the driver operation is equal to or less than a reset threshold, the motor output current to the boost motor 24 is limited by the first current limit value and the process advances to step S3.

Figure 5:
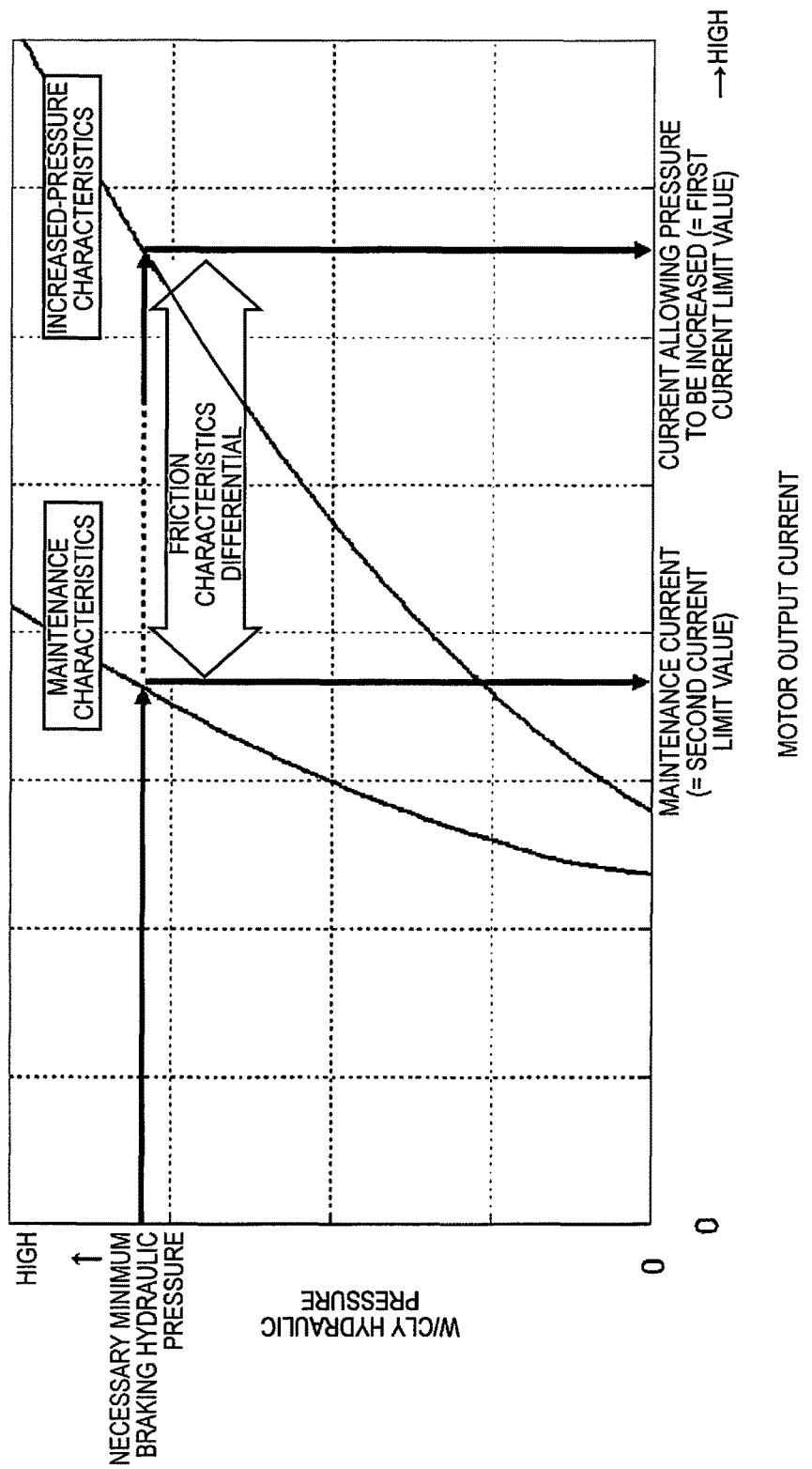
FIG. 5 is a contrasting characteristics graph showing the contrast between the increased-pressure characteristics and the maintenance characteristics of wheel cylinder hydraulic pressure relative to the motor output current of the electric booster.

The first current limit value is set to a current value capable of increasing pressure obtained by increasing the necessary minimum braking hydraulic pressure in the increased-pressure characteristics of the wheel cylinder hydraulic pressure relative to the motor output current, as shown in FIG. 5.

In step S3, as a continuation of either the limiting of the motor output current to the first current limit value in step S2 or an assessment in step S6 that the driver operation is equal to or greater than the reset threshold, the time counted by a limit value shifting timer is reset, and the process advances to step S4.

In step S4, as a continuation of the counted time resetting in step S3, an assessment is made as to whether or not the motor output current to the boost motor 24 exceeds the second current limit value. When the assessment is YES (output current>second current limit value), the process advances to step S5, and when the assessment is NO (output current≤second current limit value), the process advances to step S11.

The second current limit value is set to a maintenance current value obtained by maintaining the necessary minimum braking hydraulic pressure, in the maintenance characteristics of the wheel cylinder hydraulic pressure relative to the motor output current, as shown in FIG. 5. The second current limit value is a value whereby the hydraulic pressure can be maintained, and is therefore smaller by a friction characteristic differential than the first current limit value which is a value where by the hydraulic pressure can be increased.

In step S5, as a continuation of either an assessment in step S4 that the output current is greater than the second current limit value, or an assessment in step S7 that the counted time is equal to or less than the response time, the time counted by the limit value shifting timer is added and the process advances to step S6.

In step S6, as a continuation of the addition of the counted time in step S5, an assessment is made as to whether or not the driver operation (pedal stroke, braking hydraulic pressure) is equal to or greater than the reset threshold (the value at which the brake pedal can be determined to have been released). When the assessment is YES (driver operation≥reset threshold), the process advances to step S7, and when the assessment is NO (driver operation<reset threshold), the process returns to step S3.

The reset threshold herein is premised on using a pedal stroke value or the outputted braking hydraulic pressure, and when a pedal stroke value is used, a release recognition value including output error and recognition error is set. A release recognition value including output error and recognition error is similarly set when the braking hydraulic pressure is used.

In step S7, as a continuation of an assessment in step S6 that the driver operation is equal to or greater than the reset threshold, an assessment is made as to whether or not the counted time exceeds the response time during which the necessary minimum braking hydraulic pressure can be outputted. When the assessment is YES (counted time>response time), the process advances to step S8, and when the assessment is NO (counted time≤response time), the process returns to step S5.

In step S8, as a continuation of an assessment in step S7 that the counted time is greater than the response time, the current limit value of the motor output current to the boost motor 24 is shifted from the first current limit value to the second current limit value, the current is limited by the second current limit value, and the process advances to step S9. The second current limit value herein refers to the second current limit value described in step S4.

In step S9, as a continuation of the limiting of the motor output current to the second current limit value in step S8, an assessment is made as to whether or not the driver operation (pedal stroke, braking hydraulic pressure) is equal to or greater than the reset threshold (the value at which the brake pedal can be determined to have been released). When the assessment is YES (driver operation≥reset threshold), the process advances to step S10, and when the assessment is NO (driver operation<reset threshold), the process returns to step S1.

In other words, if the shift to the second current limit value has not yet been made, the process returns to resetting the counted time (step S6→step S3), and if the shift to the second current limit value has been made, the state of setting the output limit to the first current limit value is resumed (step S9→step S2).

In step S10, as a continuation of an assessment in step S9 that the driver operation is equal to or greater than the reset threshold, the current output to the boost motor 24, which is limited by the second current limit value, is continued by the remaining capacity of the backup power source 14, and the process advances to the end.

In step S11, as a continuation of an assessment in step S4 that the output current is equal to or less than the second current limit value, the current output to the boost motor 24, which is limited by the first current limit value, is continued by the remaining capacity of the backup power source 14, and the process returns to step S2.

Next, the action will be described.

The action in the braking force control device of the electric vehicle of Embodiment 1 is described under the following headings: "action of setting first current limit value and second current limit value," "action of reducing consumed power by shifting current limit value," "action of shifting current limit during pedal pressing operation," and "action of shifting current limit value during pedal re-pressing operation."

Action of Setting First Current Limit Value and Second Current Limit Value

After the backup power source drive state has been reached, the question of how to set the first current limit value and the second current limit value when limiting the motor output is vital in terms of effectively reducing the backup power source capacity. The action of setting the first current limit value and the second current limit value, which reflects this question, is described below based on FIG. 5.

As a premise of shifting the current limit value during the backup power source drive state, the first current limit value and the second current limit value are set using motor output current-wheel cylinder hydraulic pressure characteristics (FIG. 5) in a brake system that uses the electric booster 2.

The current value needed to increase hydraulic pressure and the current value needed to maintain hydraulic pressure have friction characteristics due to the brake pedal, the mechanical structure, the brake fluid, and the like, and the hydraulic pressure-maintaining current value is therefore capable of better maintaining hydraulic pressure with a low current. Specifically, there is a difference in motor output current proportionate to the friction characteristic differential between the maintenance characteristics and the increased-pressure characteristics, as shown in FIG. 5.

Therefore, the motor output current at the position where the necessary minimum braking hydraulic pressure of the wheel cylinder hydraulic pressure intersects with the increased-pressure characteristics is the motor output current set to the "first current limit value," which is the current at which the wheel cylinder hydraulic pressure can be increased to the necessary minimum braking hydraulic pressure. The motor output current at the position where necessary minimum braking hydraulic pressure of the wheel cylinder hydraulic pressure intersects with the maintenance characteristics is the motor output current set to the "second current limit value," which is the current at which the necessary minimum braking hydraulic pressure can be maintained.

Therefore, unnecessary current consumption is reduced after the necessary minimum braking hydraulic pressure is outputted, and continuous braking at the necessary minimum hydraulic pressure can therefore be achieved while reducing power consumption to the necessary minimum by shifting the limit value to the second current limit value for maintaining the necessary minimum braking hydraulic pressure. For example, when the necessary minimum braking hydraulic pressure is 3.2 MPa, reducing the consumed current uses a friction characteristic differential of about 40% (increased-pressure current: 3.3 A, maintenance current: 1.8 A).

Action of Reducing Consumed Power by Shifting Current Limit Value

When the driver continuously performs a braking operation that requires at least the necessary minimum braking hydraulic pressure, a measure must be taken to reduce the continuously consumed power somehow. The action of reducing consumed power by shifting the current limit value, which reflects this measure, is described below based on FIG. 6.

For example, a comparative example is made of an instance in which the current limit value in the backup power source drive state is provided by one current limit value equivalent to the first current limit value.

In this comparative example, when the driver continuously performs a braking operation that requires at least the necessary minimum braking hydraulic pressure, the braking force control device operates as though to output at least the necessary minimum braking hydraulic pressure. In other words, the motor output current stays along the single current limit value as shown by the output current characteristics (comparative example) indicated by the dashed line in FIG. 6, and the braking hydraulic pressure exceeds the necessary minimum braking hydraulic pressure as shown by the braking hydraulic pressure characteristics (comparative example) indicated by the dashed line in FIG. 6. Therefore, power continues to be consumed at a greater rate than when the necessary minimum braking hydraulic pressure is maintained, and a backup power source capacity that allows for this power consumption must be ensured.

Embodiment 1, on the other hand, includes shifting between the first current limit value for ensuring increased-pressure characteristics, and the second current limit value which is less than the first current limit value and which is for ensuring the necessary minimum braking hydraulic pressure, when the boost motor 24 is operating due to the backup power source 14.

Figure 6:
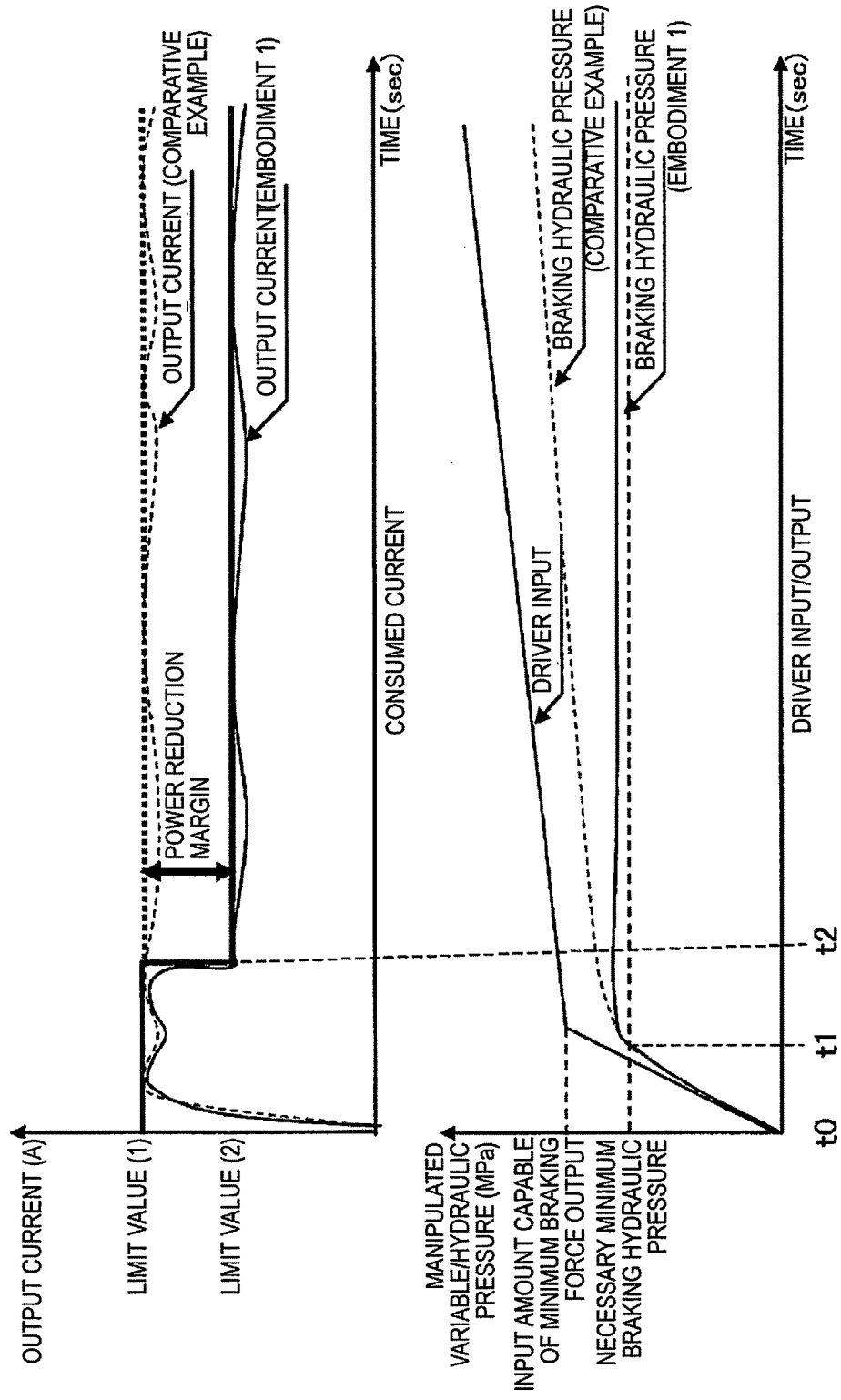
FIG. 6 is a time chart showing the characteristics of output current, driver input, and braking hydraulic pressure as affected by a current limit value shift after a transition is made to a drive state using the backup power source of the braking force control device of Embodiment 1.

Therefore, when the actuator is limited by the first current limit value as shown in FIG. 6 immediately after the transition to the drive state using the backup power source 14, pressure-increase responsiveness is ensured and the braking hydraulic pressure reaches the necessary minimum braking hydraulic pressure in a short amount of time (time t0 to t1). When the limit value is shifted and the actuator is limited by the second current limit value at time t2 after the braking hydraulic pressure has reached the necessary minimum braking hydraulic pressure, the difference between the first current limit value and the second current limit value is the reduction margin of the consumed power from time t2 onward.

Thus, the first current limit value brings the hydraulic pressure to the necessary minimum braking hydraulic pressure by a pressure increase, and the second current limit keeps the consumed power to a minimum. This two-function allocation makes it possible to reduce the capacity of the backup power source 14 for ensuring the necessary minimum total braking force, because needless power consumption is reduced in cases such as when the actuator is limited by the first current limit value alone. The braking device can be actuated for a longer amount of time by the backup power source 14 and the necessary minimum braking force can be ensured, by continuing the state of limiting the actuator by the second current limit value which keeps the consumed power to a minimum.

For example, a case is envisioned in which the vehicle is going from the maximum speed of 250 km/h to stopping at 0 km/h during the drive state using the backup power source 14, during which time the driver performs a braking operation that continuously requires a braking force of at least the necessary minimum braking hydraulic pressure. In this case, the current is reduced to the second current limit value after the necessary minimum braking hydraulic pressure is outputted, the amount of power consumed in order to increase pressure reaches a maximum of 2.5 As, and the amount of power consumed in order to maintain the necessary minimum braking hydraulic pressure reaches a maximum of 23.4 As. Therefore, in the comparative example, the maximum power amount of 45.4 As is required, while in Embodiment 1, only a minimum power amount of 25.9 As need be ensured, and a power reduction of 42% is possible.

Action of Shifting Current Limit Value During Pedal Pressing Operation

As described above, when the boost motor 24 is operating due to the backup power source 14, measures must be taken to provide a shifting condition in some manner in cases in which shifting from the first current limit value to the second current limit value occurs. The action of shifting the current limit value during the pedal pressing operation, which reflects this measure, is described below based on FIGS. 4 and 7.

After a transition has been made to a drive state using the backup power source 14, when the driver continuously performs a brake operation requiring at least the necessary minimum braking hydraulic pressure, the flowchart of FIG. 4 proceeds as follows as long as the motor output current does not exceed the second current limit value: step S1→step S2→step S3→step S4→step S11. Specifically, when a transition is made to a drive state using the backup power source 14 in step S1, limiting of the motor output current by the first current limit value is initiated in step S2. Until the assessment in step S4 is that the motor output current is greater than the second current limit value, the flow of step S2→step S3→step S4→step S11 is repeated.

Next, when it is assessed in step S4 that the motor output current is greater than the second current limit value, the flow advances from step S4 to step S5→step S6→step S7 in the flowchart of FIG. 4. While it is being assessed in step S7 that the counted time is equal to or less than the response time, the flow of step S5→step S6→step S7 in the flowchart of FIG. 4 is repeated until it is assessed in step S7 that the counted time is greater than the response time. The motor output current thereby continues to be limited by the first current limit value until the elapsed time from the start of the time count by the limit value shifting timer exceeds the response time during which the necessary minimum braking hydraulic pressure can be outputted.

Next, when it is assessed in step S7 that the counted time is greater than the response time, the flow advances from step S7 to step S8→step S9→step S10→end in the flowchart in FIG. 4. Specifically, in step S8, a shift is made from the motor output current being limited by the first current limit value to the motor output current being limited by the second current limit value, and in step S10, the limiting of the motor output current by the second current limit value is continued by the remaining capacity of the backup power source 14.

Figure 7:
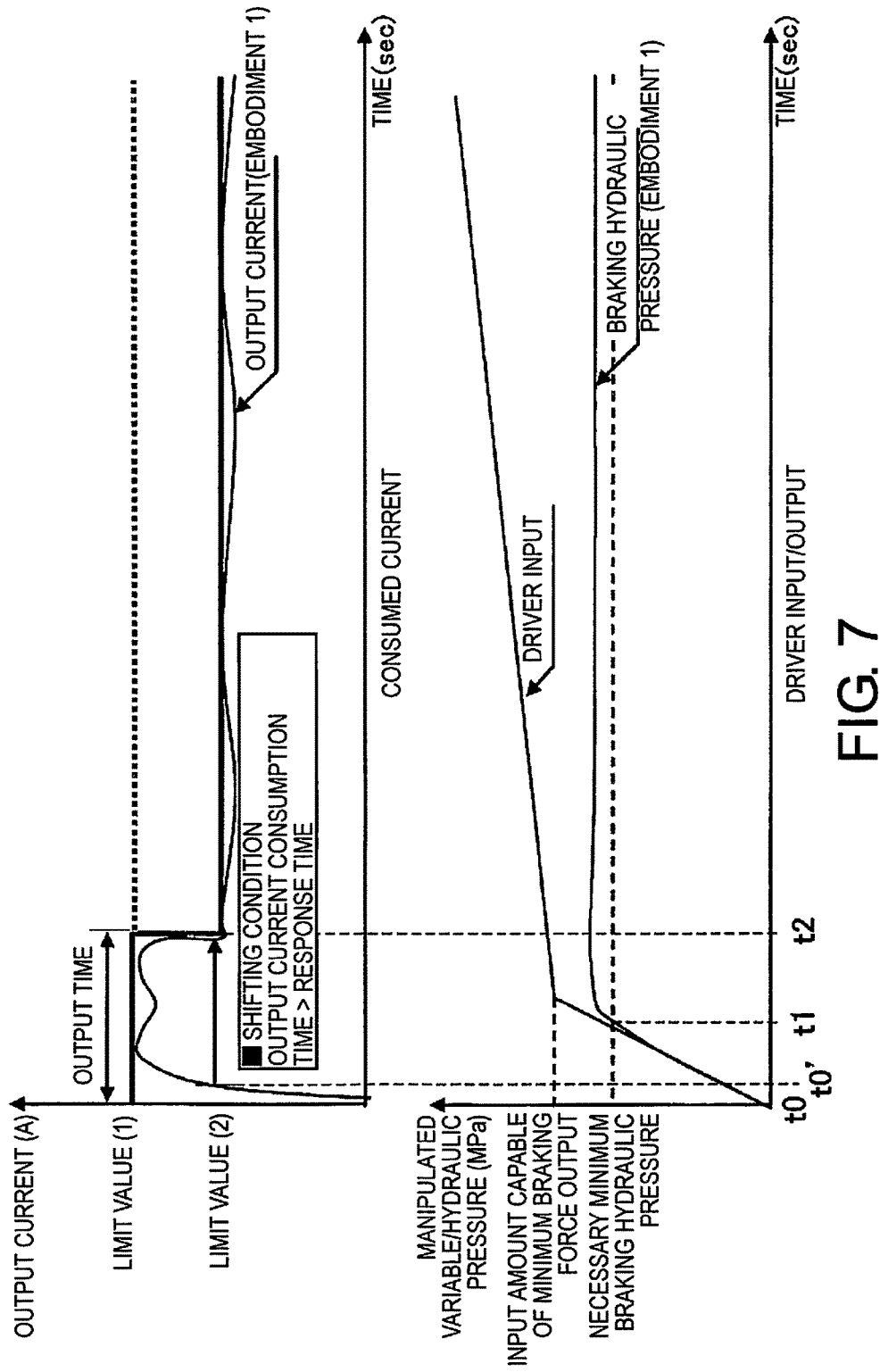
FIG. 7 is a time chart showing the characteristics of output current, driver input, and braking hydraulic pressure during a pedal pressing operation after a transition is made to a drive state using the backup power source of the braking force control device of Embodiment 1.

FIG. 7 is a time chart of Embodiment 1, in which the condition for shifting from the first current limit value to the second current limit value is the output current consumption time. With the brake system of Embodiment 1, the pressure-increasing time until the necessary minimum braking hydraulic pressure is reached (time t0 to t1) is about 0.5 s (a pedal pressing force per unit time of about 750 N/s, for example, when the driver suddenly brakes). During this pressure-increasing time of about 0.5 s, it is possible to determine that the necessary minimum braking hydraulic pressure has been reached if a steady current value output continues. However, characteristic differences due to component errors and environmental conditions must be taken into account, and a 50% leeway margin is added as a characteristic difference so that a shift is made from the first current limit value to the second current limit value when 0.75 s (time t0 to t3) or more have elapsed.

Next, the current value at which the time count is initiated by the limit value shifting timer is set to a current value (equivalent to the second current limit value) at which the necessary minimum braking hydraulic pressure can be maintained (time t0'), as shown by the characteristics in FIG. 7. In the current characteristics of the brake system of Embodiment 1, the output current value is equal to or less than the maintenance current in a state in which the pedal has been released and the brake system is performing an action for lowering the braking hydraulic pressure. Therefore, when a current of at least the second current limit value is being outputted, it can be considered that the driver is performing an operation attempting to achieve a braking force of at least the necessary minimum braking hydraulic pressure.

Therefore, due to making the condition of shifting from the first current limit value to the second current limit value to be the output current consumption time, it is possible to reliably output the necessary minimum braking hydraulic pressure.

Action of Shifting Current Limit Value During Pedal Re-Pressing Operation

After the driver presses back on the brake pedal in a drive state using the backup power source 14, it can be considered that a pedal re-pressing operation is being performed in which the pedal is pressed again. Consequently, a measure must be taken to make the current limit value shifting control correspond to this pedal re-pressing operation. An action of shifting the current limit value during a pedal re-pressing operation that reflects this measure is described below based on FIGS. 4 and 8.

For example, a comparative example is made of an instance in which control is performed for shifting from the first current limit value to the second current limit value after a transition has been made to a backup power source drive state, and the second current limit value is thereafter maintained regardless of the driver operation.

In this comparative example, after the output limit has been shifted to the second current limit value and the driver has pressed back the brake pedal, a pedal re-pressing operation of pressing the pedal again (pumping operation) is carried out. In this case, the output limit continues to be limited by the second current limit value whereby hydraulic pressure can only be maintained even when the brake pedal is being re-pressed, and a problem therefore encountered is that after the pedal re-pressing operation, the pressure-increasing function cannot be carried out even when attempting to increase the wheel cylinder hydraulic pressure, and the necessary minimum braking hydraulic pressure cannot be reached.

In the configuration in Embodiment 1, during a state of limiting by the second current limit value, a pressing back of the pedal (a pedal release) by the driver is detected, limiting by the second current limit value is reset, and limiting is shifted back to the first current limit value at which pressure can be increased.

Specifically, during limiting by the second current limit value, when the driver operation falls below the reset threshold, the process in the flowchart of FIG. 4 returns from step S9 to step S2, and the current limit is shifted back from the second current limit value to the first current limit value.

In step S9, either a pedal stroke value representing the driver operation or a braking hydraulic pressure value is used as the parameter for determining a reset, and an assessment is made as to whether or not the parameter has fallen below the reset threshold at which it can be determined that the pedal has been released.

When the pedal stroke is used as the shifting condition, the stroke value when the pedal has been completely released (e.g. 0.75 mm: a value with sensor error, AD conversion error, etc. added) is used as the reset threshold because it is difficult to determine a re-pressing with braking hydraulic pressure taken out of the correlation between braking hydraulic pressure and stroke. When the braking hydraulic pressure is used as the shifting condition, the value used as the reset threshold is a value (e.g. 2.9 MPa: a value accounting for sensor error and AD conversion error relative to necessary minimum braking hydraulic pressure) that accounts for hunting in which there is frequent shifting between the first current limit value and the second current limit value, because it is easy to detect a re-pressing action by the driver from a change in hydraulic pressure.

Figure 8:
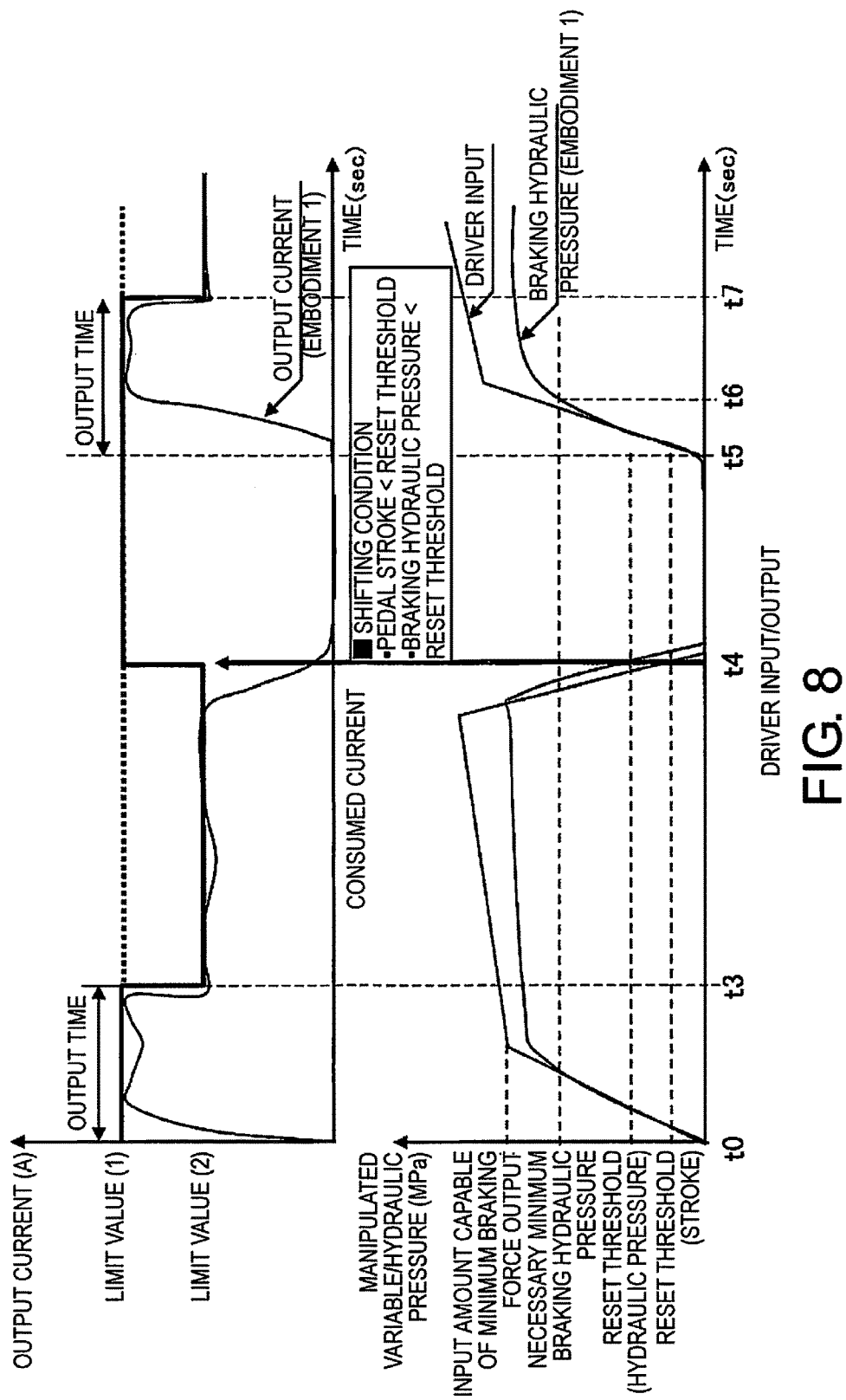
FIG. 8 is a time chart showing the characteristics of output current, driver input, and braking hydraulic pressure during a pedal re-pressing operation after a transition is made to a drive state using the backup power source of the braking force control device of Embodiment 1.

Therefore, in a case in which the driver performs a pedal re-pressing operation of re-pressing the brake pedal after having pressed the pedal in a drive state using the backup power source 14, when the driver operation falls below the reset threshold at time t4 in FIG. 8, the current limit is shifted from the second current limit value back to the first current limit value. When the brake pedal is thereafter re-pressed at time t5, after the pedal re-pressing operation, increasing the wheel cylinder hydraulic pressure by means of the first current limit value is exhibited, and the necessary minimum braking hydraulic pressure is reached at time t6. In current limit value shifting control, the shift from limiting by the first current limit value to limiting by the second current limit value is made at time t7, which is an allowance of extra time from time t6.

Thus in Embodiment 1, unnecessary current consumption by excessive driver operation can be reduced, the necessary minimum braking hydraulic pressure can be reliably outputted according to the driver operation, and the capacity setting of the backup power source 14 can therefore be kept to the necessary minimum.

Next, the effects will be described.

The effects enumerated below can be achieved with the braking force control device for an electric vehicle of Embodiment 1.

(1) A vehicle (electric vehicle) braking force control device comprises a braking force control means or unit (the controller 21, FIG. 4) for shifting to a drive state so as to use an auxiliary power source (the backup power source 14) when a main power source (the vehicle power source 1) fails, and limiting the current outputted to an electric actuator (the boost motor 24) of a braking device (the electrically boosted brake device 6) for producing braking hydraulic pressure when a transition is made to the drive state using the auxiliary power source (the backup power source 14), wherein the braking force control unit (the controller 21, FIG. 4) shifts among at least two current limit values during actuation of the electric actuator (the boost motor 24) by the auxiliary power source (the backup power source 14), the current limit values including a first current limit value for ensuring increased-braking-hydraulic-pressure characteristics, and a second current limit value for ensuring a necessary minimum braking hydraulic pressure, the second current limit value being less than the first current limit value.

Therefore, after a transition has been made to a drive state using the auxiliary power source (the backup power source 14), the necessary minimum braking force can be ensured while reducing the auxiliary power source capacity (the backup power source capacity), by reducing needless power consumption.

(2) The braking force control unit (the controller 21, FIG. 4), which includes two current limit values in the form of the first current limit value and the second current limit value, imposes a limit in the form of the first current limit value immediately after the transition to the drive state using the auxiliary power source (the backup power source 14) until the braking hydraulic pressure reaches the necessary minimum braking hydraulic pressure, and shifts the limiting from the first current limit value to the second current limit value (FIG. 6) after the braking hydraulic pressure has reached the necessary minimum braking hydraulic pressure.

Therefore, in addition to the effects in (1), when the driver continuously performs a braking operation requiring at least the necessary minimum braking hydraulic pressure during a drive state using the auxiliary power source (the backup power source 14), the amount of power consumed can be effectively reduced after the shift to the second current limit value.
As a result, when the auxiliary power source capacity (the backup power source capacity) is the same capacity of that of the comparative example of a single current limit value, the drive state using the auxiliary power source (the backup power source 14) can have a greater time of possible actuation than the comparative example. When the time of possible actuation of the drive state using the auxiliary power source is the same as that of the comparative example of a single current limit value, the auxiliary power source capacity (the backup power source capacity) can be less than that of the comparative example.

(3) When the electric actuator (the boost motor 24) is being actuated by the auxiliary power source (the backup power source 14) and a shift has been made to the second current limit value, the braking force control unit (the controller 21, FIG. 4) returns to the first current limit value when a driver operation equivalent value falls below a reset threshold representing the release of the brake pedal (step S9→step S2, FIG. 8).

Therefore, in addition to the effects in (1) or (2), when the driver performs a pedal re-pressing operation of re-pressing the brake pedal after having pressed the pedal back in a drive state using the auxiliary power source (the backup power source 14), the braking hydraulic pressure can be reliably brought to the necessary minimum braking hydraulic pressure.

(4) The braking force control unit (the controller 21, FIG. 4) uses the output current consumption time as a condition of shifting between the first current limit value and the second current limit value to set the first current limit value immediately after a shift to a drive state using the auxiliary power source (the backup power source 14), and shifting to the second current limit value when the time during which the output current exceeds the second current limit value in the drive state using the auxiliary power source (backup power source 14) is greater than the time during which the necessary minimum braking hydraulic pressure can be outputted with the output response characteristics of the first current limit value (step S7→step S8, FIG. 7).

Therefore, in addition to the effects in (1) to (3), the necessary minimum braking hydraulic pressure can be reliably outputted by making the output current consumption time be the condition for shifting from the first current limit value to the second current limit value.

Embodiment 2

Embodiment 2 is an example in which instead of the output current consumption time of Embodiment 1, the braking hydraulic pressure is used as the condition for shifting from the first current limit value to the second current limit value.

First, the configuration will be described.

Figure 9:
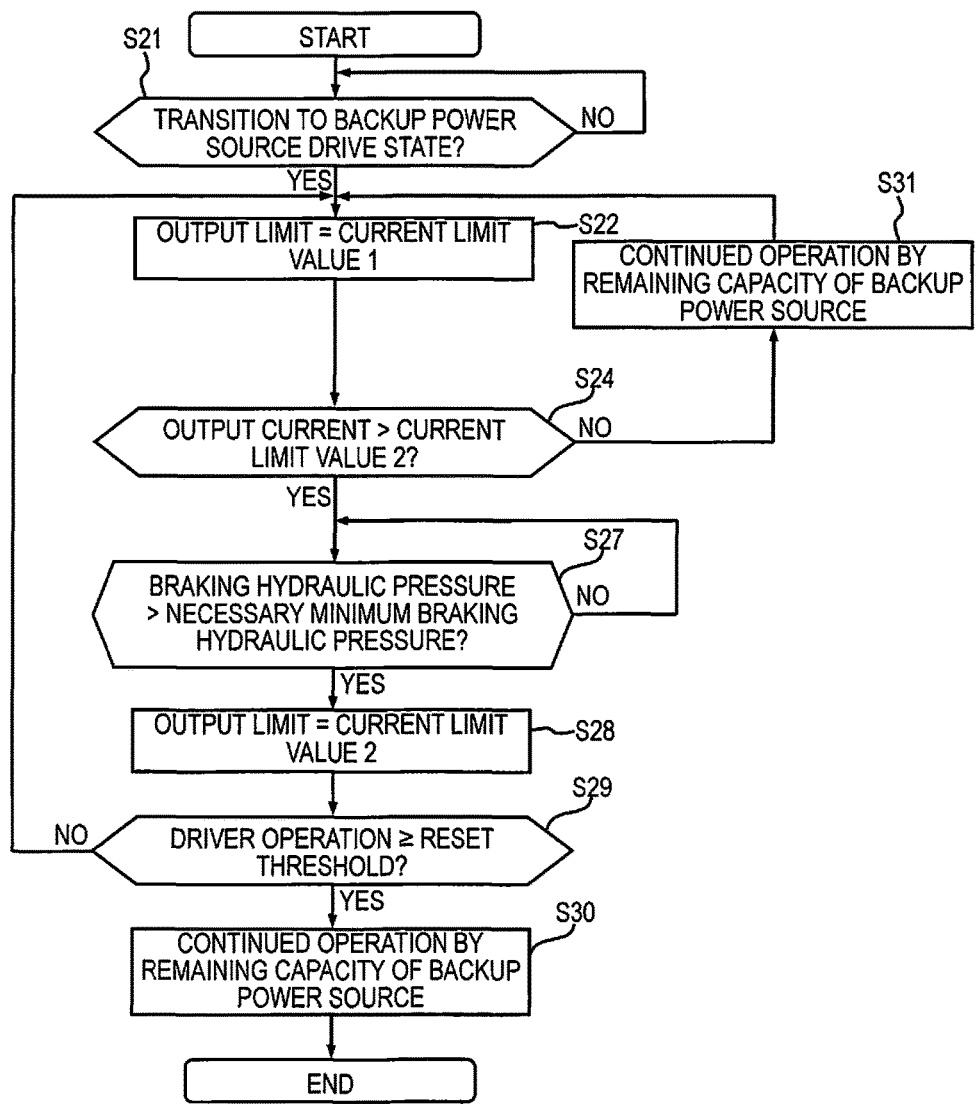
FIG. 9 is a flowchart showing the flow of a braking force control process using current limits, executed by a controller of an electric booster in the braking force control device of Embodiment 2.

FIG. 9 is a flowchart showing the flow of a braking force control process using current limits, executed by the controller 21 of the electric booster 2 in the braking force control device of Embodiment 2. The steps of FIG. 9 representing the braking force control configuration are described below.

The steps in step S21, step S22, step S24, step S28, step S29, step S30, and step S31 are the same as the steps in step S1, step S2, step S4, step S8, step S9, step S10, and step S11 in FIG. 4, and are therefore not described.

In step S27, as a continuation of the assessment in step S24 that the output current is greater than the second current limit value, an assessment is made as to whether or not the braking hydraulic pressure from the braking hydraulic pressure sensor 75 at the time exceeds the necessary minimum braking hydraulic pressure. When the assessment is YES (braking hydraulic pressure>necessary minimum braking hydraulic pressure), the process advances to step S28, and when the assessment is NO (braking hydraulic pressure≤necessary minimum braking hydraulic pressure), the process advances to step S25.

The configuration in FIGS. 1 to 3 is the same as that of Embodiment 1, and is therefore not shown or described.

Next, in Embodiment 2, in a state in which the output current exceeds the second current limit value and is being limited by the first current limit value, when it is assessed in step S27 that the braking hydraulic pressure is greater than the necessary minimum braking hydraulic pressure, the process advances to the next step S28, and the current limit value is shifted from the first current limit value to the second current limit value.

Figure 10:
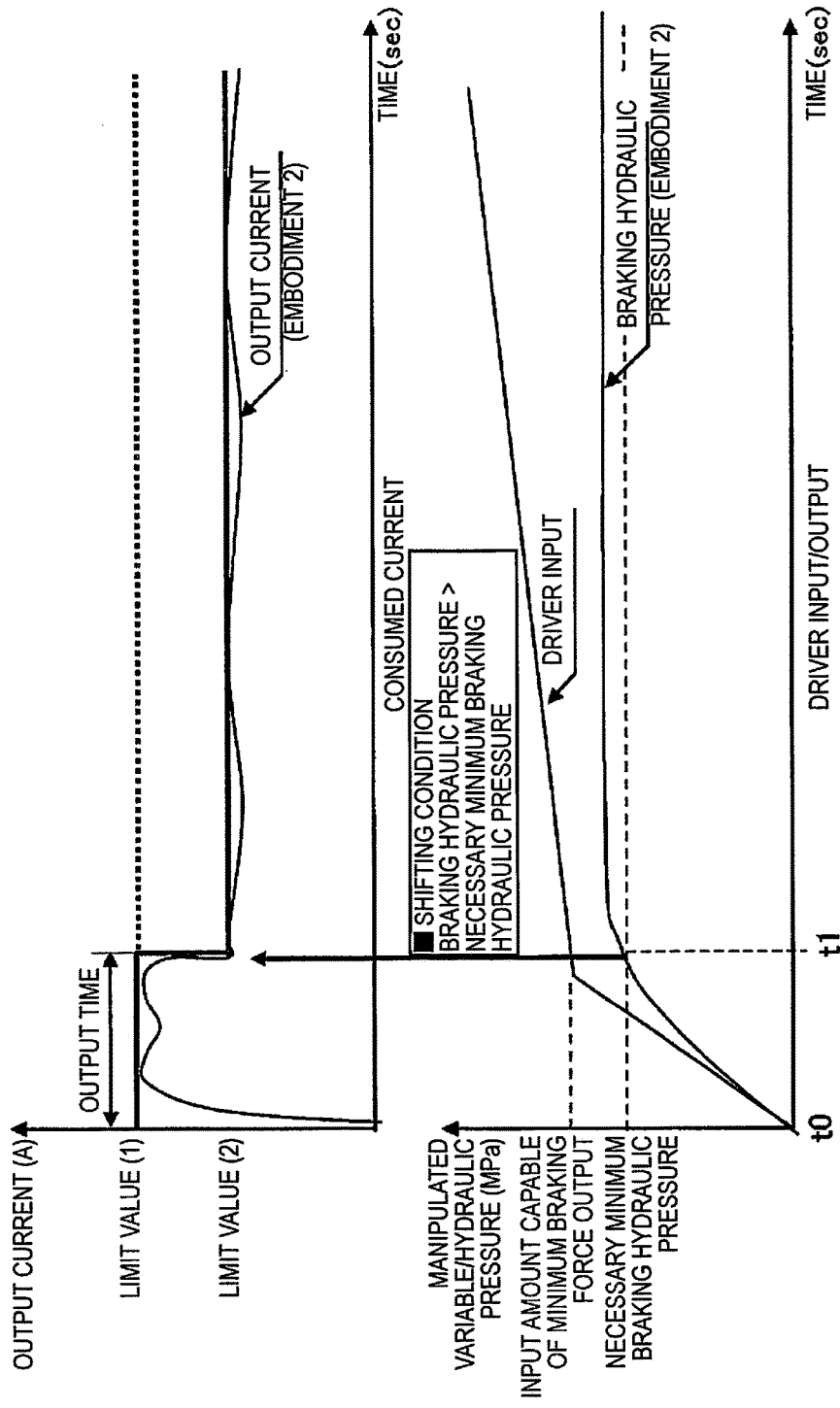
FIG. 10 is a time chart showing the characteristics of output current, driver input, and braking hydraulic pressure during a pedal pressing operation after a transition is made to a drive state using the backup power source of the braking force control device of Embodiment 2.

FIG. 10 shows a time chart of Embodiment 2, in which the condition for shifting from the first current limit value to the second current limit value is the braking hydraulic pressure.

The necessary minimum braking force in the brake system of Embodiment 2 is 4 m/s$^2$. The necessary minimum braking hydraulic pressure for ensuring this necessary minimum braking force is about 3.2 MPa, and if it is possible to reliably detect that the necessary minimum braking hydraulic pressure is being outputted, the output limit can be shifted to the second current limit value. Therefore, a shift determination is made when the braking hydraulic pressure as the shifting condition exceeds the necessary minimum braking hydraulic pressure (about 3.5 MPa, accounting for hydraulic pressure characteristic differences due to hydraulic pressure sensor output error and environment changes) (time t1 in FIG. 10).

Therefore, it is possible to reduce power in accordance with output corresponding to the driver input, and it is possible to avoid early limit intervention before the necessary minimum braking hydraulic pressure is reached.

The other actions are the same as Embodiment 1 and are therefore not described.

Next, the effects will be described.

In the braking force control device of an electric vehicle of Embodiment 2, the following effects can be achieved in addition to the effects in (1) to (3) of Embodiment 1.

(5) The braking force control unit (the controller 21, FIG. 9) uses the braking hydraulic pressure as a condition of shifting between the first current limit value and the second current limit value to set the first current limit value immediately after a shift to a drive state using the auxiliary power source (the backup power source 14), and shifting to the second current limit value when the braking hydraulic pressure exceeds the necessary minimum braking hydraulic pressure during the drive state using the auxiliary power source (the backup power source 14) (FIG. 10).

Therefore, due to the braking hydraulic pressure being the condition for shifting from the first current limit value to the second current limit value, it is possible to reduce power in accordance with output corresponding to the driver input, and it is possible to avoid early limit intervention before the necessary minimum braking hydraulic pressure is reached.

The vehicle braking force control device of the present invention is described above based on Embodiments 1 and 2, but the specific configuration is not limited to these embodiments, and alterations, additions, and other changes to the design are permitted as long as they do not deviate from the scope of the invention as in the claims.

Embodiments 1 and 2 depict an example of the braking force control unit including two current limit values: the first current limit value and the second current limit value. However, the braking force control unit may include three or more current limit values: current limit values depending on the operated condition of the pedal in addition to the first current limit value and the second current limit value.

Embodiments 1 and 2 depict an example in which fixed values established in advance are provided as the first current limit value and the second current limit value. However, another possible example is one in which an initial value provided as a current limit value can be varied by environmental factors (temperature and the like) for determining the responsiveness of the electric actuator and the responsiveness of the braking hydraulic pressure.

Embodiments 1 and 2 depict an example in which the braking control device of the present invention is applied to an electric vehicle such as a hybrid vehicle or an electric automobile. However, the braking control device can of course also be applied to a gasoline vehicle equipped with a braking device that uses an electrically boosted brake device or an electric actuator, for example.

The invention claimed is:

1. A vehicle braking force control device comprising:
a braking force control unit configured to shift to an auxiliary power mode so as to use an auxiliary power source when a main power source fails, and to limit current outputted to an electric actuator of a braking device for producing braking hydraulic pressure when a transition is made to the auxiliary power mode using the auxiliary power source,
the braking force control unit having two current limit values used during actuation of the electric actuator by the auxiliary power source, the two current limit values including a first current limit value for increasing the braking hydraulic pressure to reach a minimum required brake fluid pressure, and a second current limit value for maintaining the minimum required brake fluid pressure when operating the electric actuator with the auxiliary power source,
the second current limit value being less than the first current limit value,
the braking force control unit being configured to impose the first current limit value immediately after the transition to the auxiliary power mode until the braking hydraulic pressure reaches the minimum required brake fluid pressure, and to shift the limiting from the first current limit value to the second current limit value after the braking hydraulic pressure has reached the minimum required brake fluid pressure,
the braking force control unit being configured to return to the first current limit value when a release of the brake pedal is detected while the current outputted to the electric actuator is being limited by the second current limit value.

2. The vehicle braking force control device according to claim 1, wherein
the braking force control unit is configured to use an output current consumption time as a condition of shifting between the first current limit value and the second current limit value to set the first current limit value immediately after the transition to the auxiliary power mode, and to shift to the second current limit value when a time during which the current outputted to the electric actuator exceeds the second current limit value in the auxiliary power mode is greater than a time during which the minimum required brake fluid pressure can be outputted with output response characteristics of the first current limit value.

3. The vehicle braking force control device according to claim 1, wherein
the braking force control unit is configured to use the braking hydraulic pressure as a condition of shifting between the first current limit value and the second current limit value to set the first current limit value immediately after the transition to the auxiliary power mode, and to shift to the second current limit value when the braking hydraulic pressure exceeds the minimum required brake fluid pressure during the auxiliary power mode.

4. The vehicle braking force control device according to claim 1, wherein
the braking force control unit is configured to use an output current consumption time as a condition of shifting between the first current limit value and the second current limit value to set the first current limit value immediately after the transition to the auxiliary power mode, and to shift to the second current limit value when a time during which the current outputted to the electric actuator exceeds the second current limit value in the auxiliary power mode is greater than a time during which the minimum required brake fluid pressure can be outputted with output response characteristics of the first current limit value.

5. The vehicle braking force control device according to claim 1, wherein
the braking force control unit is configured to use the braking hydraulic pressure as a condition of shifting between the first current limit value and the second current limit value to set the first current limit value immediately after the transition to the auxiliary power mode, and to shift to the second current limit value when the braking hydraulic pressure exceeds the minimum required brake fluid pressure during the auxiliary power mode.

\* \* \* \* \*